(12) United States Patent
Clute et al.

(10) Patent No.: US 7,568,649 B2
(45) Date of Patent: Aug. 4, 2009

(54) VEHICLE SENSITIVE SEAT BELT RETRACTOR CONTROL WITH SUPPRESSED Z-AXIS SENSITIVITY

(75) Inventors: Gunter K. Clute, Bloomfield Hills, MI (US); Robert A. Mical, Dearborn Heights, MI (US)

(73) Assignee: Autoliv ASP, Inc., Ogden, UT (US)

( * ) Notice: Subject to any disclaimer, the term of this patent is extended or adjusted under 35 U.S.C. 154(b) by 198 days.

(21) Appl. No.: 11/726,466

(22) Filed: Mar. 23, 2007

(65) Prior Publication Data

US 2008/0230644 A1 Sep. 25, 2008

(51) Int. Cl.
*B60R 22/40* (2006.01)
(52) U.S. Cl. .................... 242/384.5; 242/384.6
(58) Field of Classification Search .............. 242/383.2, 242/384.5–384.6
See application file for complete search history.

(56) References Cited

U.S. PATENT DOCUMENTS

| 3,758,044 | A |   | 9/1973  | Nilssen            |
|-----------|---|---|---------|--------------------|
| 3,838,831 | A | * | 10/1974 | Bell .......... 242/384.5 |
| 3,901,459 | A |   | 8/1975  | Romanzi et al.     |
| 4,084,840 | A | * | 4/1978  | Buff et al. .......... 297/478 |
| 4,085,905 | A | * | 4/1978  | Lindbald .......... 242/384.2 |
| 4,135,410 | A | * | 1/1979  | Filderman .......... 74/411.5 |
| 4,262,858 | A |   | 4/1981  | Takada             |
| 4,314,680 | A |   | 2/1982  | Takada             |
| 4,458,920 | A |   | 7/1984  | Ozaki              |
| 4,879,906 | A |   | 11/1989 | Meline et al.      |
| 4,915,411 | A |   | 4/1990  | Norton             |
| 4,936,601 | A |   | 6/1990  | Tada               |
| 5,271,639 | A |   | 12/1993 | Nishizawa          |
| 5,388,464 | A |   | 2/1995  | Maddison           |
| 5,526,996 | A |   | 6/1996  | Ebner et al.       |
| 5,562,269 | A |   | 10/1996 | Protz, Jr.         |
| 5,622,327 | A |   | 4/1997  | Heath et al.       |
| 5,622,383 | A |   | 4/1997  | Kielwein et al.    |
| 5,636,807 | A |   | 6/1997  | Warrick            |
| 5,687,926 | A |   | 11/1997 | Park et al.        |
| 5,848,758 | A |   | 12/1998 | Ernst              |
| 5,882,084 | A |   | 3/1999  | Verellen et al.    |

(Continued)

FOREIGN PATENT DOCUMENTS

EP 0 761 513 5/2000

(Continued)

*Primary Examiner*—Sang Kim
(74) *Attorney, Agent, or Firm*—Sally J Brown; Brinks Hofer Gilson & Lione

(57) ABSTRACT

A vehicle sensitive retractor control system having reduced sensitivity to Z-axis acceleration experienced during normal driving. The retractor control system incorporates a rolling mass and a locking lever which, in a resting position, are arranged such that the locking lever does not engage a ratchet wheel of a seat belt retractor spool. In response to accelerations in the horizontal plane, the rolling ball mass becomes unseated from its resting position and engages the locking lever, causing it to pivot and lock the retractor. In response to Z-axis acceleration, the rolling mass is prevented from contacting the locking lever by a mass restrictor. A soft damping spring is also provided to bias the locking lever against a lever rest. The spring is sized to overcome the inertia of the locking lever and prevent it from "bouncing up" and engaging the ratchet wheel in response to Z-axis accelerations.

13 Claims, 4 Drawing Sheets

U.S. PATENT DOCUMENTS 6,139,053 A   10/2000  Knox
6,299,093 B1  10/2001  Harte et al.
6,386,472 B1   5/2002  Rogers
6,435,442 B1   8/2002  Kielwein et al.
6,547,175 B2   4/2003  Kielwein et al.
6,647,788 B2  11/2003  Murai et al.
6,802,470 B2  10/2004  Smithson et al.

FOREIGN PATENT DOCUMENTS

GB    2 157 045   10/1985

* cited by examiner

VEHICLE SENSITIVE SEAT BELT RETRACTOR CONTROL WITH SUPPRESSED Z-AXIS SENSITIVITY

FIELD OF THE INVENTION

This invention relates to an automotive occupant restraint seat belt retractor, and particularly to a vehicle sensitive control system for such a retractor.

BACKGROUND OF THE INVENTION

Motor vehicles are frequently equipped with active occupant restraint systems such as seat belt assemblies. Seat belt assemblies typically have a lap and shoulder belt portion for restraining the occupant in the event of an impact or rollover event. To enhance the comfort and convenience provided by the seat belt system, retractors are provided which allow the belt webbing to be freely paid-out and retracted when the vehicle is not subjected to unusual acceleration forces or inclination. In the event of exposure to such forces, a retractor control system activates to lock the retractor to prevent additional pay-out of webbing. Thus, the retractor locks in a manner to enable the seat belt webbing to restrain the occupant. Such retractor control systems take various forms. One category of such control systems are known as vehicle sensitive control systems. These systems are sensitive to acceleration forces acting on the vehicle, for example in the case of a frontal impact condition in which the vehicle experiences a high level deceleration load. Such devices also lock the retractor in the event of side impacts, rollovers, and when certain other forces act on the vehicle.

Another category of such retractor control systems are known as webbing sensitive control systems. These devices operate much in the manner of a centrifugal clutch and sense the rotational speed of the retractor spool, such that when extremely high angular accelerations of the retractor spool occurs associated with rapid pay-out of webbing, the control system engages to lock the retractor. This invention is related to an improved vehicle sensitive retractor control system.

As mentioned previously, vehicle sensitive retractor control systems must be sensitive to acceleration loads acting in various axes and planes. Primarily important are impacts to the vehicle creating acceleration loads acting in the horizontal plane, such as front, rear, or side impact conditions. However, if a rollover event has occurred, it is important that the retractor lock to restrain the occupant. Typical vehicle sensitive retractor control systems utilize a pendulum or rolling ball mass to activate a locking lever which engages with a ratchet wheel of the retractor webbing spool. When acceleration loads act on the vehicle, the rolling ball mass or pendulum moves to urge a locking lever to engage with the ratchet wheel of the retractor spool, thus locking the spool from further pay-out of webbing. These devices have been utilized for many decades and have proven to be reliable and effective retractor control systems.

Designers of vehicle sensitive control systems attempt to design the systems such that they lock the retractor when necessary to restrain the occupant while minimizing locking during normal driving conditions. Normal maneuvers of the vehicle, driving up and down inclines and over bumpy roads can produce forces causing a periodic locking of the retractor. This periodic locking in normal driving conditions is undesirable from an occupant comfort viewpoint. The problems of unnecessary locking of retractors tend to be especially significant in heavy duty truck-type vehicles. These vehicles, due to their operating conditions, heavy loads, and suspension systems, tend to undergo significant jaunts or vertical displacements as they are driven, especially over uneven road surfaces. This motion creates accelerations in the Z-axis direction, defined as the vertical axis of the vehicle. Presently available vehicle sensitive retractor control systems generally produce undesirable locking due to normally encountered Z-axis accelerations, especially in heavy truck applications.

In view of the above, it is apparent that there exists on need for an improved retractor control system that is less sensitive to normally encountered Z-axis accelerations.

SUMMARY OF THE INVENTION

In satisfying the above need, as well as overcoming the enumerated drawbacks and other limitations of the related art, the present invention provides a vehicle sensitive retractor control system having intentionally reduced sensitivity to normal Z-axis accelerations of a motor vehicle. The control system utilizes a rolling mass which, when displaced, engages a locking lever to lock a seat belt retractor. A mass restrictor is positioned to restrict the distance the mass may move along the Z-axis (i.e. vertically) when subject to Z-axis accelerations, preventing the mass from engaging the locking lever under such conditions. In addition, a damping spring is provided to bias the locking lever to overcome its inertia under Z-axis accelerations, preventing the locking lever from "bouncing up" and locking the retractor. Thus, the combination of the mass restrictor and the damping spring render the control system relatively insensitive to Z-axis accelerations. However, should the vehicle experience sufficient accelerations along the other axes, the mass is free to engage the locking lever and lock the retractor when necessary.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
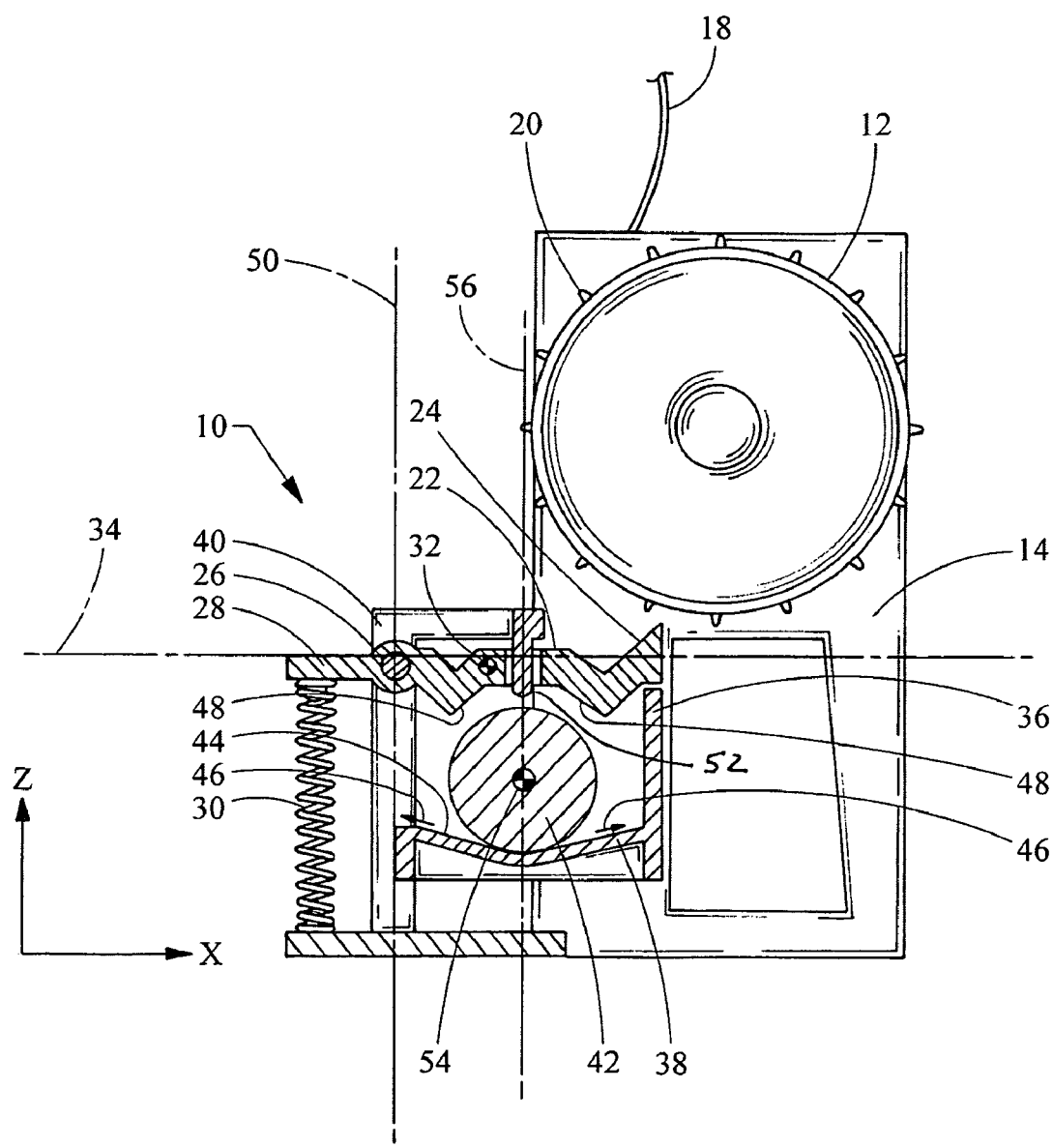
FIG. 1 is a side cross-section of a reduced Z-axis sensitivity control system according to this invention.

A vehicle sensitive retractor control system in accordance with a first embodiment of this invention is shown in FIG. 1 and identified by reference number 10. The control system 10 is used with a ratchet wheel 12 which is part of a belt retractor 14 having a rotating webbing spool 16 (see FIG. 2). The webbing spool 16 rotates as seat belt webbing 18 is extended from the retractor 14 and retracted into the retractor 14 during its normal operation. An internal torsion spring (not shown) acts on webbing spool 16, urging it rotationally to pull the webbing into the retractor 14. Ratchet wheel 12 includes an array of teeth 20 around its perimeter. These teeth 20 are used to enable the control system 10 to lock the webbing retractor spool 14 under specific operating conditions.

Figure 2:
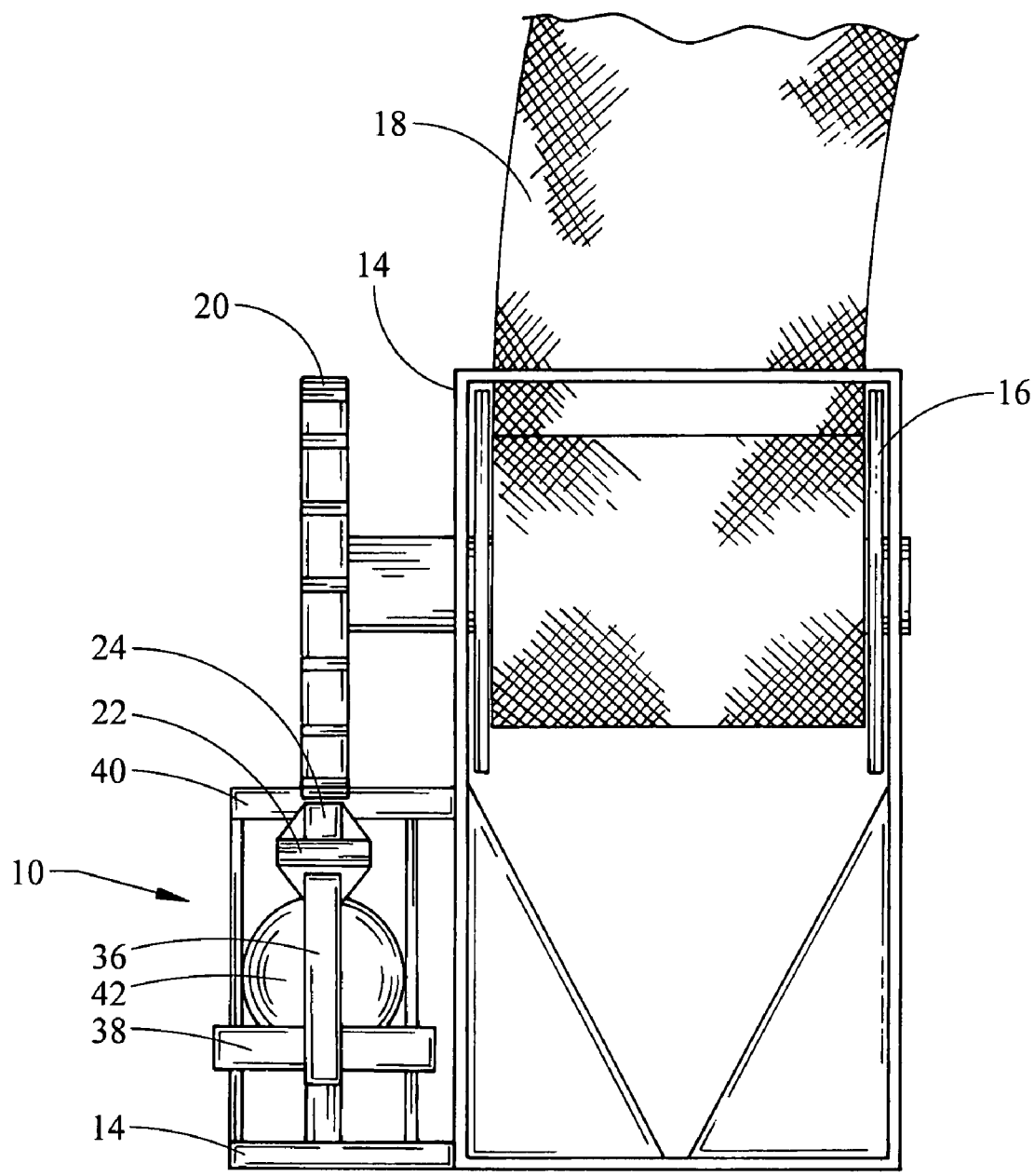
FIG. 2 is a front view of the control system of FIG. 1.

A control system locking lever 22 includes an upward projecting engagement finger 24 and is rotatable over a limited range of angular motion about a pivot 26. The rotational motion of the locking lever 22 is about an axis aligned perpendicular (normal) to the drawing sheet of FIG. 1. When affixed to a vehicle, the belt retractor 14 may have a number of orientations. In the example of FIG. 2 the control system 10 and belt retractor 14 would be positioned as shown when viewed from the back of the vehicle, with the left-hand end of the assembly facing the inside of the vehicle. An arm 28 extends in the opposite direction from the pivot 26 and engagement finger 24 and engages a spring 30. The overall mass distribution of the locking lever 22 places its center of gravity (CG) 32 at the position illustrated in FIG. 1 which is on the opposite side of the pivot 26 from the arm 28, generally positioned in the same horizontal line 34 as pivot 26. Thus, if no other forces than gravity are acting on the locking lever 22, the position of the CG 32 would urge it to rotate in the clockwise direction with regard to the orientation of the lever 22 shown in FIG. 1, urging the locking lever 22 to rest upon a lever rest 36.

A ball socket 38 is fixed to a frame 40 of the control system 10 and provides an area for the retention of a ball mass 42. As shown in FIG. 1, the ball socket 38 includes a sloped surface 44 which positions the ball mass 42, by gravity, in the position shown in FIG. 1. In that position, the ball mass 42, resting at the bottom of the sloped surface 44 does not engage any other feature than the sloped surface 44. FIG. 1 illustrates the orientation of the elements in a normal resting condition when no significant acceleration loads are acting on the control system 10 other than gravity. In this position, the ball mass 42 rests on the sloped surface 44 and gravity keeps the engagement finger 24 in a position out of engagement with the ratchet wheel 12.

Figure 3:
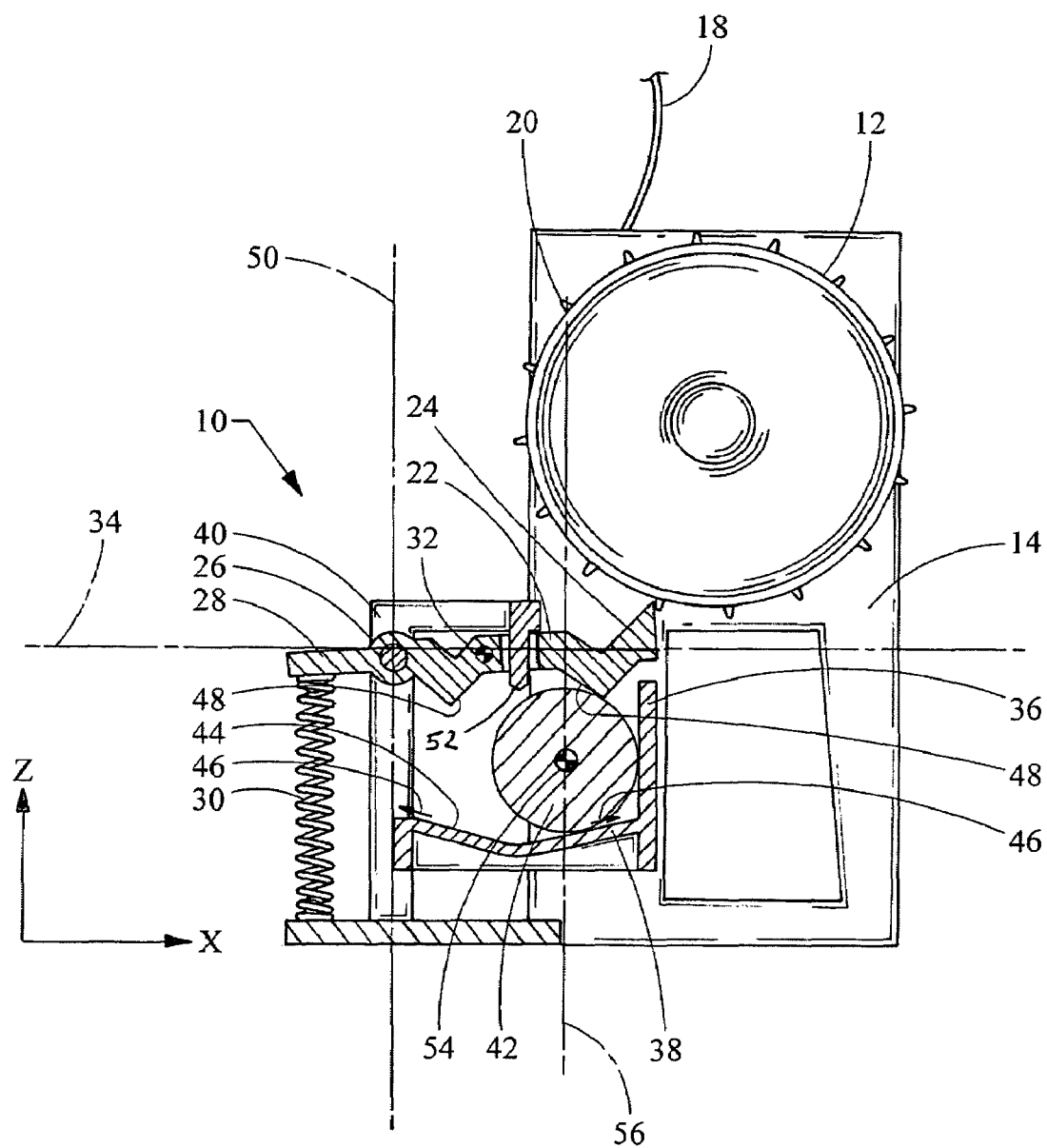
FIG. 3 is the control system of FIG. 1 subject to a rearward acceleration.
Figure 4:
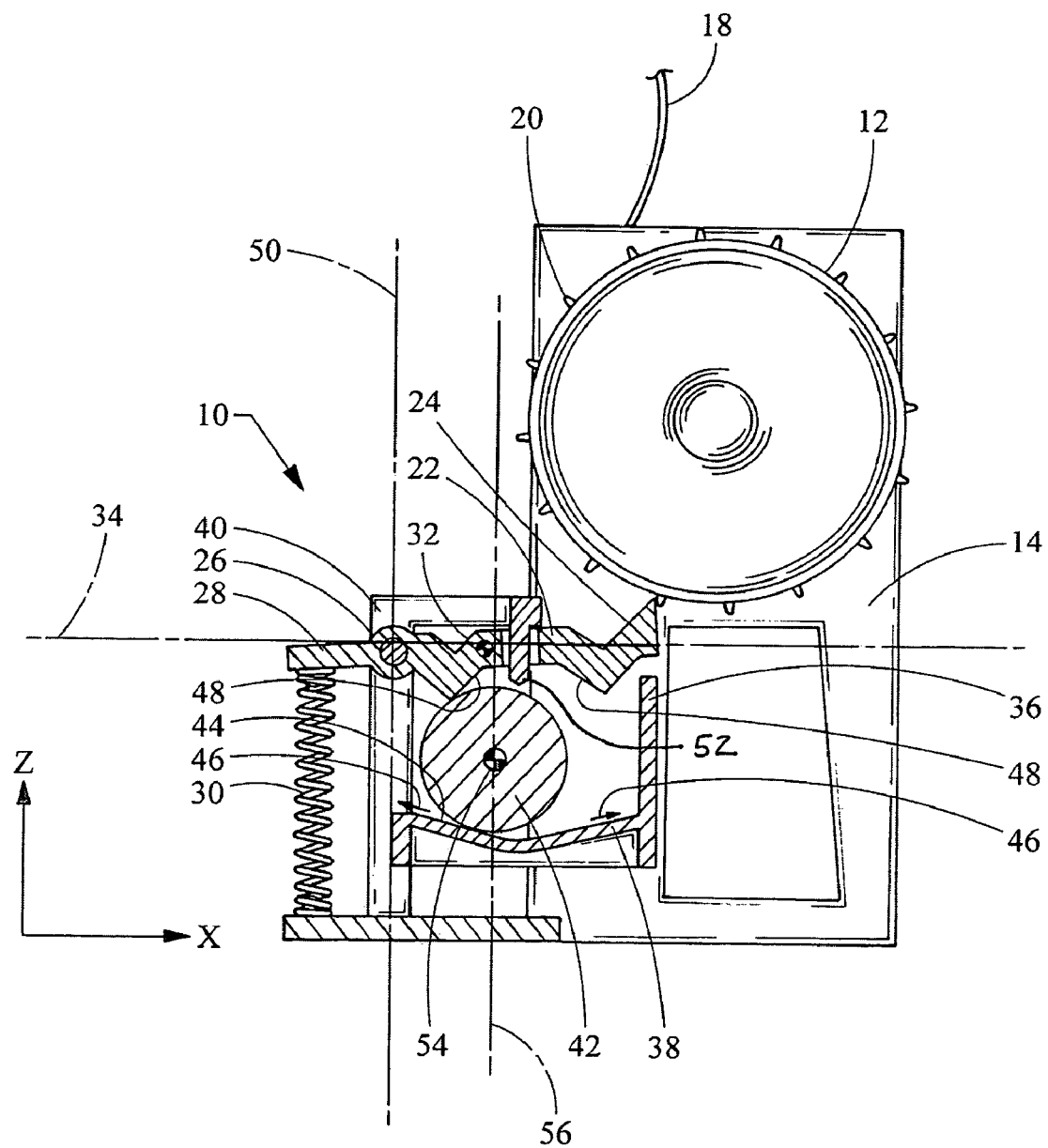
FIG. 4 is the control system of FIG. 1 subject to a forward acceleration.

In the event that the control system 10 is exposed to an acceleration load acting in a horizontal plane, designated by line 34, the ball mass 42 becomes unseated from the base of the sloped surface 44 and rolls up the sloped surface 44, generally in a direction indicated by one of the arrows 46. In this position, the ball mass 42 contacts a surface 48 of the locking lever 22, urging the engagement finger 24 generally upward, along a Z-axis 50. This is shown in FIG. 3 which shows the position of the ball mass 42 in the event of a generally rearward acceleration of the vehicle. In this condition, the engagement finger 24 engages with the teeth 20, preventing the webbing 18 from paying out from the retractor 14.

As mentioned previously, the retractor control system 10 is intentionally designed to be relatively insensitive to accelerations in the vertical Z-axis (shown by line 50 in FIG. 1). Generally, a downward acting Z-axis acceleration would cause two effects resulting in undesirable engagement of the ratchet wheel 12 by the locking lever 22. First, the ball mass 40 would become unseated (lifted) from the sloped surface 44 and contact the locking lever 22, causing it to rotate counter-clockwise. Second, because of the position of the lever CG 32, the locking lever 22 would be urged to rotate by inertia, also in the counterclockwise direction. To prevent such motion the retractor control system 10 includes a stationary ball restrictor 52 coupled to the frame 40 and positioned above a ball center of gravity (CG) 54 along a vertical line 56 that intersects the ball CG 54 when the ball mass 42 is at rest at the bottom of the sloped surface 44. In addition, the spring 30 is sized to provide just enough force to overcome the effects of inertia and keep the locking lever 22 against the lever rest 36 when subject to normal downward acting Z-axis accelerations. An upward acting Z-axis acceleration would cause the ball mass 42 to be more firmly engaged within the sloped surface 44 and the locking lever 22 will be urged to rotate clockwise but, due to contact with the lever rest 36, will remain stationary.

Finally, the end of the ball restrictor 52 in contact with the ball mass 42 may be shaped to urge the ball mass 42 into contact with the locking lever 22 when the vehicle is in an inverted orientation. For example, an angled, pointed or rounded shape may be provided. Thus, when the vehicle is inverted the ball mass 42 will tend to roll off the ball restrictor 52 and engage the locking lever 22 with the ratchet wheel 12.

While the above description constitutes the preferred embodiment of the present invention, it will be appreciated that the invention is susceptible to modification, variation and change without departing from the proper scope and fair meaning of the accompanying claims.

The invention claimed is:

1. A vehicle sensitive seat belt retractor control system for a vehicle for locking a vehicle seat belt retractor in the event of acceleration loads acting on the retractor in a horizontal plane while having a reduced sensitivity to acceleration loads acting in a Z-axis direction, perpendicular to the horizontal plane, the control system engaging with a toothed ratchet wheel to lock a spool of the retractor, the control system comprising:

a locking lever pivotable about a pivot, the locking lever having an engagement finger engageable with the ratchet wheel, the locking lever having a center of gravity positioned relative to the pivot such that in a non-inverted orientation of the vehicle, gravity acts on the locking lever to urge the locking lever to pivot from an engaged position with the ratchet wheel to a disengaged position from the ratchet wheel, and a spring acting to urge the locking lever into the disengaged position, and a moveable mass displaceable from a resting position to a displaced position in response to acceleration loads in the horizontal plane acting in the horizontal plane and in the Z-axis direction, the moveable mass separated from the locking lever while in the resting position allowing the locking lever to remain in the disengaged position, wherein when acceleration loads act on the moveable mass, the moveable mass moves to the displaced position, contacting the locking lever and moving the locking lever to the engaged position, and a stationary restrictor, provided above a center of gravity of the moveable mass while in the resting position, restricts the moveable mass from moving to the displaced position and contacting the locking lever in response to acceleration loads acting in the Z-axis direction.

2. The vehicle sensitive retractor control system according to claim 1 further comprising the moveable mass in the form of a ball.

3. The vehicle sensitive retractor control system according to claim 2 further comprising a ball socket having an angled surface for positioning the ball in the resting position.

4. The vehicle sensitive retractor control system according to claim 1 further comprising the engagement finger contacting and engaging teeth of the ratchet wheel.

5. The vehicle sensitive retractor control system according to claim 1 wherein the restrictor includes an end shaped to urge the moveable mass to move off of the restrictor and to contact the locking lever and move the locking lever to the engaged position when the vehicle is in an inverted condition.

6. The vehicle sensitive retractor control system according to claim 5 wherein the end has an angled shape.

7. The vehicle sensitive retractor control system according to claim 5 wherein the end has a rounded shape.

8. The vehicle sensitive retractor control system according to claim 1 wherein the position of the center of gravity of the locking lever is generally horizontally displaced from the pivot.

9. The vehicle sensitive retractor control system according to claim 8 wherein the locking lever center of gravity is positioned relative to the pivot on the same side of the locking lever as the engagement finger.

10. The vehicle sensitive retractor control system according to claim 1 wherein the locking lever does not contact the moveable mass in the resting position by means of a lever rest resisting gravity and forces exerted by the spring acting upon the locking lever.

11. The vehicle sensitive retractor control system according to claim 1 wherein the spring is sized to resist inertial forces of the locking lever in response to acceleration loads acting in the Z-axis direction.

12. The vehicle sensitive retractor control system according to claim 1 wherein the locking lever includes an aperture for receiving the restrictor.

13. The vehicle sensitive retractor control system according to claim 1 wherein the spring is positioned opposite the locking lever pivot relative to the locking lever center of gravity.

* * * * *